(12) United States Patent
Azuma

(10) Patent No.: US 6,683,917 B1
(45) Date of Patent: Jan. 27, 2004

(54) BASE BAND SIGNAL PROCESSING CIRCUIT CAPABLE OF IMPROVING BOTH NOISE CHARACTERISTIC AND DISTORTION CHARACTERISTIC

(75) Inventor: Toshiyuki Azuma, Kanagawa-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/419,982

(22) Filed: Oct. 18, 1999

(30) Foreign Application Priority Data

Oct. 19, 1998 (JP) .......................................... 10-296975

(51) Int. Cl.⁷ ............................................. H04L 27/20
(52) U.S. Cl. ...................... 375/308; 375/279; 375/281; 375/295; 375/298
(58) Field of Search ............................... 375/295, 296, 375/279, 281, 308, 298; 332/103, 102; 341/118

(56) References Cited

U.S. PATENT DOCUMENTS

| | | | |
|---|---|---|---|
| 4,990,867 A | | 2/1991 | Ogura et al. ................. 332/102 |
| 5,548,253 A | | 8/1996 | Durrant ....................... 332/103 |
| 5,731,772 A | * | 3/1998 | Mikkola et al. ............. 341/118 |
| 5,896,421 A | * | 4/1999 | Zamat et al. ................ 375/296 |
| 6,014,065 A | * | 1/2000 | Nishikawa ................... 332/103 |
| 6,114,921 A | * | 9/2000 | Aoki ........................... 332/103 |

* cited by examiner

*Primary Examiner*—Shuwang Liu
(74) *Attorney, Agent, or Firm*—Brinks Hofer Gilson & Lione

(57) ABSTRACT

The base band signal processing circuit of the present invention intends to improve both the noise characteristic and the distortion characteristic, and moreover set both the characteristics in a desirable balance. The base band signal processing circuit is configured as follows: the first active low-pass filter and the second active low-pass filter are each formed in the balanced type, the first D/A converter differentially outputs the first base band signals and differentially inputs them to the first active low-pass filter, the second D/A converter differentially outputs the second base band signals and differentially inputs them to the second active low-pass filter, the first active low-pass filter differentially outputs the first base band signals, and the second active low-pass filter differentially outputs the second base band signals.

2 Claims, 2 Drawing Sheets

BASE BAND SIGNAL PROCESSING CIRCUIT CAPABLE OF IMPROVING BOTH NOISE CHARACTERISTIC AND DISTORTION CHARACTERISTIC

BACKGROUND OF THE INVENTION

1. Field of the Invention

The present invention relates to a base band signal processing circuit that processes a base band signal required for digitally modulating a carrier.

2. Description of the Related Art

In the transmission in the CDMA portable telephone, audio signals and various control signals are transformed into a digital signal by means of a spread signal, this digital signal is converted into an analog signal, and using the analog signal the carrier is digitally modulated (modulated in QPSK mode).

Referring to FIG. 3, a conventional base band signal processing circuit will be explained.

First, audio signals, etc., are transformed into a digital signal D by a digital processing circuit not illustrated, which is inputted to a first D/A converter 21 and a second D/A converter 22. The first D/A converter 21 and the second D/A converter 22 convert the digital signal D into analog signals by means of a clock signal. The first D/A converter 21 outputs an analog I signal A/I, and the second D/A converter 22 outputs an analog Q signal A/Q. There is a 90° phase difference between the analog I signal A/I and the analog Q signal A/Q.

The analog I signal A/I and the analog Q signal A/Q each have frequency bands of about 630 kHz, and each are inputted to a first low-pass filter 23 and a second low-pass filter 24 that eliminate noises of higher frequencies than that. The first low-pass filter 23 and the second low-pass filter 24 are configured with active low-pass filters that can be integrated into ICs for the downsizing of portable telephones. The analog I signal A/I whose noises over 630 kHz are removed is amplified by a first base band signal amplifier 25, and thereafter inputted to a first modulator 27. In the same manner, the analog Q signal A/Q whose noises over 630 kHz are removed is amplified by a second base band signal amplifier 26, and thereafter inputted to a second modulator 28. The first and second base band signal amplifiers 25, 26 are configured with operational amplifiers.

Further, in order to set the level of the analog I signal A/I inputted to the first modulator 27 and the level of the analog Q signal A/Q inputted to the second modulator 28 to a specific level (for example, 1 volt), the amplification factors of the first base band signal amplifier 25 and the second base band signal amplifier 26 are designed to be varied individually.

In addition to the analog I signal A/I, the first modulator 27 is supplied with a first carrier Φ/I, and in addition to the analog Q signal Q/I, the second modulator 28 is supplied with a second carrier Φ/Q. There is a 90° phase difference between the first carrier Φ/I and the second carrier Φ/Q, and they are generated by a phase-shifter 30 using an original carrier (frequency is about 130 MHz) delivered from a carrier oscillator 29.

Thus, the first modulator 27 applies the PSK modulation to the first carrier Φ/I by means of the analog I signal A/I, and the second modulator 28 applies the PSK modulation to the second carrier Φ/Q by means of the analog Q signal Q/I.

The two carriers modulated in PSK mode are added by an adder 31, and then to the two carriers thus added a frequency converter not illustrated executes the frequency conversion into a transmission signal of, for example, 800 MHz band to 900 MHz band. Thereafter, specific processing is further applied to the transmission signal, which is transmitted to the base station from an antenna not illustrated.

In the base band signal processing circuit explained above, aiming at the downsizing of the portable telephones, various circuits are integrated into ICs, and the scale of integration has been expanded. In addition, it has been pursued to lower the power supply voltage. This lowering of the supply voltage will inevitably deteriorate the noise characteristic S/N and the distortion characteristic S/D in the first and second D/A converters 21, 22, the first and second low-pass filters 23, 24, the first and second base band signal amplifiers 25, 26, and the like.

As a measure for this problem, to swell the level of the base band signal will improve the noise characteristic S/N, but it will deteriorate the distortion characteristic S/D. On the contrary, to reduce the level of the base band signal will improve the distortion characteristic S/D, but it will deteriorate the noise characteristic S/N. Thus, the noise characteristic S/N and the distortion characteristic S/D are on the counterbalance; and therefore, it has been a great problem how to arrange a compromise of improvement between these two characteristics.

SUMMARY OF THE INVENTION

Accordingly, it is an object of the present invention to provide a base band signal processing circuit that improves both the noise characteristic and the distortion characteristic as well as sets each of the characteristics in a well-balanced state.

In order to accomplish the foregoing object, the base band signal processing circuit of the present invention contains a first D/A converter that converts a digital signal into analog signals and outputs them as first base band signals, a second D/A converter that converts the digital signal into analog signals and outputs them as second base band signals having a phase shifted by 90° against the first base band signals, a first active low-pass filter, and a second active low-pass filter. In this construction, the first active low-pass filter and the second active low-pass filter are each configured in a balanced type, the first base band signals are differentially outputted from the first D/A converter and differentially inputted to the first active low-pass filter, the second base band signals are differentially outputted from the second D/A converter and differentially inputted to the second active low-pass filter, the first base band signals are differentially outputted from the first active low-pass filter, and the second base band signals are differentially outputted from the second active low-pass filter.

Further, in the base band signal processing circuit of the present invention, a first balanced type variable attenuator is provided between the first D/A converter and the first active low-pass filter, a second balanced type variable attenuator is provided between the second D/A converter and the second active low-pass filter, the levels of the first base band signals inputted to the first active low-pass filter are made to be varied by the first balanced type variable attenuator, and the levels of the second base band signals inputted to the second active low-pass filter are made to be varied by the second balanced type variable attenuator.

Further, the base band signal processing of the present invention contains a first balanced type variable gain amplifier and a second balanced type variable gain amplifier. In this construction, the first balanced type variable gain amplifier amplifies the first base band signals outputted from the first active low-pass filter to output in the differential mode, the second balanced type variable gain amplifier amplifies the second base band signals outputted from the second active low-pass filter to output in the differential mode, and the amplification factor of the first balanced type amplifier and the amplification factor of the second balanced type amplifier are to be varied.

DETAILED DESCRIPTION OF A PREFERRED EMBODIMENT

Figure 1:
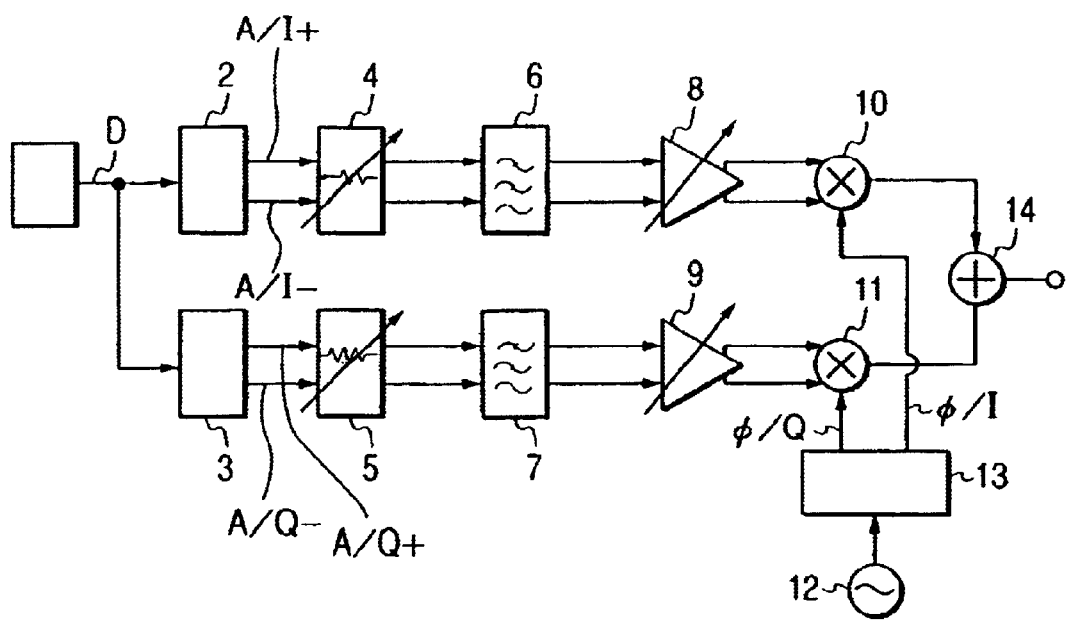
FIG. 1 is a block diagram to explain a base band signal processing circuit of the present invention.
Figure 2:
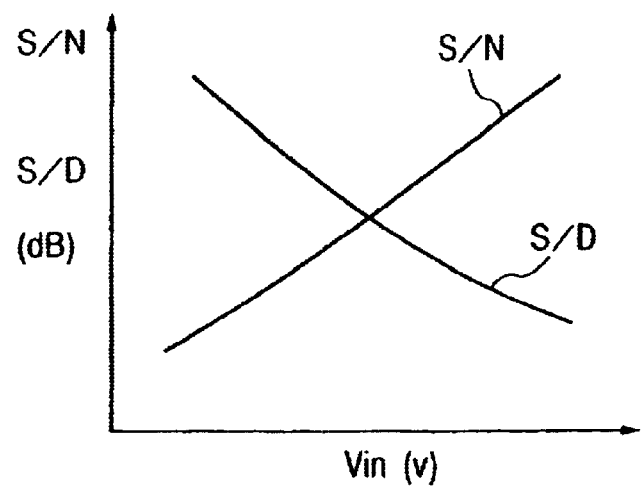
FIG. 2 is a chart to explain a noise characteristic and a distortion characteristic.
Figure 3:
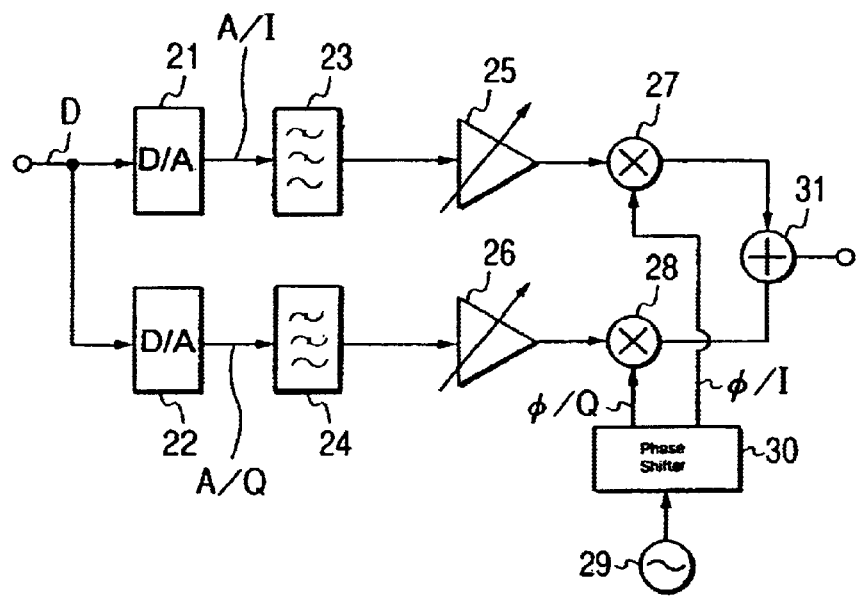
FIG. 3 is a block diagram to explain a conventional base band signal processing circuit.

A base band signal processing circuit of the present invention will now be discussed with reference to FIG. 1 and FIG. 2. FIG. 1 is a block diagram to explain a base band signal processing circuit of the present invention, and FIG. 2 is a chart to explain a noise characteristic and a distortion characteristic.

First, in FIG. 1, a digital processing circuit 1 converts audio signals, etc., into a digital signal D by means of a spread signal. The digital signal D is inputted to a first D/A converter 2 and a second D/A converter 3. The first D/A converter 2 and the second D/A converter 3 are supplied with clock signals (not illustrated) each having different phases, and each of these D/A converters converts the digital signal D into analog signals by means of the clock signals. The first D/A converter 2 possesses two output terminals, from which two analog I signals A/I$^+$, A/I$^-$ are differentially outputted, being two first base band signals in opposite phase to each other. In the same manner, the second D/A converter 3 possesses two output terminals, from which two analog Q signals A/Q$^+$, A/Q$^-$ are differentially outputted, being two second base band signals in opposite phase to each other. And, there is a 90° phase difference between the first base band signals and the second base band signals.

Next, the two analog I signals A/I$^+$, A/I$^-$ are inputted to a first variable attenuator 4 being a first balanced type attenuator, the other two analog Q signals A/Q$^+$, A/Q$^-$ are inputted to a second variable attenuator 5 being a second balanced type attenuator. The first variable attenuator 4 and the second variable attenuator 5 each have two input terminals and two output terminals to each form a balanced type, and moreover they are designed to vary the output levels. Thus, the two analog I signals A/I$^+$, A/I$^-$ are differentially inputted to the first variable attenuator 4, and also the other two analog Q signals A/Q$^+$, A/Q$^-$ are differentially inputted to the second variable attenuator 5. And, the differential outputs are each delivered from the first and the second variable attenuators 4, 5.

The analog I signals A/I$^+$, A/I$^-$ and the analog Q signals A/Q$^+$, A/Q$^-$ each have frequency bands of about 630 kHz, and each are inputted to a first active low-pass filter 6 and a second active low-pass filter 7, in the differential mode, that eliminate noises of higher frequencies than that. The first active low-pass filter 6 and the second active low-pass filter 7 each have two inputs and two outputs to each form a balanced type. The analog I signals A/I$^+$, A/I$^-$ whose noises over 630 kHz are removed are differentially inputted to a first base band signal amplifier 8 being a first balanced type amplifier. In the same manner, the analog Q signals A/Q$^+$, A/Q$^-$ whose noises over 630 kHz are removed are differentially inputted to a second base band signal amplifier 9 being a second balanced type amplifier.

The first base band signal amplifier 8 and the second base band signal amplifier 9 each have two input terminals and two output terminals to each configure a balanced type by differential amplifiers, and moreover they are variable gain amplifiers that can vary the amplification factors. The analog I signals A/I$^+$, A/I$^-$ amplified by the first base band signal amplifier 8 are differentially inputted to a first modulator 10 as the first base band signal, and also the analog Q signals A/Q$^+$, A/Q$^-$ amplified by the second base band signal amplifier 9 are differentially inputted to a second modulator 11 as the second base band signal.

The first and second modulators 10, 11 each have two base band signal input terminals.

The peak to peak voltage between the two analog I signals A/I$^+$ and A/I$^-$ inputted to the first modulator 10 and the peak to peak voltage between the two analog Q signals A/Q$^+$ and A/Q$^-$ inputted to the second modulator 11 are set to be, for example, 1 volt. This setting is carried out by the first and second variable attenuators 4, 5 and the first and second base band signal variable gain amplifiers 8, 9.

In addition to the two analog I signals A/I$^+$ and A/I$^-$, the first modulator 10 is supplied with a first carrier Φ/I, and in addition to the two analog Q signals A/Q$^+$ and A/Q$^-$, the second modulator 11 is supplied with a second carrier Φ/Q. There is a 90° phase difference between the first carrier Φ/I and the second carrier Φ/Q, and they are generated by a phase-shifter 13 using an original carrier (frequency is about 130 MHz) delivered form a carrier oscillator 12.

Thus, the first modulator 10 applies the QPSK modulation to the first carrier Φ/I, using the analog I signals A/I$^+$ and A/I$^-$, and the second modulator 11 applies the QPSK modulation to the second carrier Φ/Q, using the analog Q signals A/Q$^+$ and A/Q$^-$.

The two carriers modulated in QPSK mode are added by an adder 14, and then to the two carriers thus added a frequency converter not illustrated executes the frequency conversion into a transmission signal of, for example, 800 MHz band to 900 MHz band. Thereafter, specific processing is further applied to the transmission signal, which is transmitted to the base station from an antenna not illustrated.

In the above configuration, the analog I signal A/I$^+$ and the analog I signal A/I$^-$ are in opposite phase to each other, and also the analog Q signal A/Q$^+$ and the analog Q signal A/Q$^-$, are in opposite phase to each other. Further, the analog I signals A/I$^+$ and A/I$^-$ and the analog Q signals A/Q$^+$ and A/Q$^-$ are inputted and outputted in the differential mode through the first and second variable attenuators 4, 5, the first and second active low-pass filters 6, 7, and the first and second base band signal amplifiers 8, 9. Accordingly, the signal levels handled in these circuits become half compared to the conventional. Therefore, the intercept points of the fundamentals and the third distortion harmonics become high in the first and second active low-pass filters 6, 7, and the first and second base band signal amplifiers 8, 9, etc., which include active elements. As the result, the distortion characteristic S/D is improved and the allowable input signal level is raised. Thus, the noise characteristic S/N is also improved.

If the noise characteristic S/N is set to the same level (55 dB) as the conventional, for example, the distortion characteristic S/D is improved by 6 dB. On the contrary, if the distortion characteristic S/D is set to the same level as the conventional, the noise characteristic S/N is improved by 6 dB. Thus, both the distortion characteristic S/D and the noise characteristic S/N can be improved at the same time within the foregoing range of improvement; And, as shown in FIG. 2, as the input signal level Vin is increased, the distortion characteristic S/D is deteriorated and the noise characteristic S/N is improved. Therefore, it is possible to set the balance of both the characteristics by adjusting the attenuation of the first and second variable attenuators 4, 5 and the amplification factors of the first and second base band signal amplifiers 8, 9.

If the distortion characteristic S/D is regarded as important, for example, it is only needed to enlarge the attenuation of the first and second variable attenuators 4, 5, and to raise the amplification factors of the first and second base band signal amplifiers 8, 9. On the other hand, if the noise characteristic S/N is regarded as important, it is only needed to diminish the attenuation of the first and second variable attenuators 4, 5, and to lower the amplification factors of the first and second base band signal amplifiers 8, 9.

As described above, in the base band signal processing circuit of the present invention, the first active low-pass filter and the second active low-pass filter are each formed in the balanced type, the first base band signals differentially outputted from the first D/A converter are differentially inputted to the first active low-pass filter, the second base band signals differentially outputted from the second D/A converter are differentially inputted to the second active low-pass filter, the first base band signals are differentially outputted from the first active low-pass filter, and the second base band signals are differentially outputted from the second active low-pass filter; and therefore, the levels of the signals inputted to the first and second active low-pass filters become half compared to the conventional. Consequently, the intercept points of the fundamentals and the third harmonics in the first and the second active low-pass filters become high. This will improve the distortion characteristic and raise the allowable signal input level, thereby improving the noise characteristic.

Further, in the base band signal processing circuit of the present invention, the first balanced type attenuator is installed between the first D/A converter and the first active low-pass filter, the second balanced type attenuator is installed between the second D/A converter and the second active low-pass filter, the levels of the first base band signals inputted to the first active low-pass filter are made to be varied by the first balanced type attenuator, and the levels of the second base band signals inputted to the second active low-pass filter are made to be varied by the second balanced type attenuator; and therefore, it becomes easy to set the noise characteristic and the distortion characteristic in a desirable balance.

Further, in the base band signal processing circuit of the present invention, the first balanced type amplifier and second balanced type amplifier are further provided, the first balanced type amplifier amplifies the first base band signals outputted from the first active low-pass filter to output in the differential mode, the second balanced type amplifier amplifies the second base band signals outputted from the second active low-pass filter to output in the differential mode, and the amplification factor of the first balanced type amplifier and the amplification factor of the second balanced type amplifier are made to be varied; and therefore, it is possible to appropriately set the balance of the noise characteristic and the distortion characteristic, and besides to set the levels of the first and second base band signals to specific values.

What is claimed is:

1. A base band signal processing circuit comprising:
   a first D/A converter that converts a digital signal into a first set of differentially outputted analog signals as first base band signals;
   a second D/A converter that converts said digital signal into a second set of differentially outputted analog signals as second base band signals that are phase shifted by 90° compared to said first base band signals;
   a first balanced type active low-pass filter, and a second balanced type active low-pass filter; and
   a first balanced type attenuator disposed between said first D/A converter and said first active low-pass filter, and a second balanced type attenuator disposed between said second D/A converter and said second active low-pass filter;
   wherein said first base band signals are differentially supplied to an input of said first attenuator, said second base band signals are differentially supplied to an input of said second attenuator;
   attenuated first base band signals having a first level are differentially supplied from an output of said first attenuator, and attenuated second base band signals having a second level are differentially supplied from an output of said second attenuator; and,
   the first level of said first base band signals inputted to said first active low-pass filter are varied by said first attenuator, and the second level of said second base band signals inputted to said second active low-pass filter are varied by said second attenuator.

2. The base band signal processing circuit according to claim 1, comprising a first balanced type amplifier and a second balanced type amplifier, wherein said first balanced type amplifier amplifies the first base band signals from said first active low-pass filter such that the first base band signals are differentially output, said second balanced type amplifier amplifies the second base band signals from said second active low-pass such that the second base band singals are differentially output and an amplification factor of said first balanced type amplifier and an amplification factor of said second balanced type amplifier are varied.

* * * * *

UNITED STATES PATENT AND TRADEMARK OFFICE
CERTIFICATE OF CORRECTION

PATENT NO. : 6,683,917 B1
DATED : January 27, 2004
INVENTOR(S) : Toshiyuki Azuma It is certified that error appears in the above-identified patent and that said Letters Patent is hereby corrected as shown below:

Column 6,
Line 54, immediately after "differentially output" insert -- , -- (comma).

Signed and Sealed this

Fifteenth Day of November, 2005

JON W. DUDAS
*Director of the United States Patent and Trademark Office*